(12) United States Patent
Kang

(10) Patent No.: US 6,680,821 B2
(45) Date of Patent: Jan. 20, 2004

(54) SLIDER AIR BEARING SURFACE HAVING IMPROVED FLY HEIGHT PROFILE CHARACTERISTICS

(75) Inventor: Soo-Choon Kang, San Jose, CA (US)

(73) Assignee: Hitachi Global Storage Technologies, The Netherlands B.V., Amsterdam (NL)

( * ) Notice: Subject to any disclaimer, the term of this patent is extended or adjusted under 35 U.S.C. 154(b) by 96 days.

(21) Appl. No.: 09/838,701

(22) Filed: Apr. 18, 2001

(65) Prior Publication Data
US 2002/0181153 A1 Dec. 5, 2002

(51) Int. Cl.[7] .............................................. G11B 17/32
(52) U.S. Cl. .................................. 360/236.2; 360/235.7
(58) Field of Search ........................... 360/235.4, 235.6, 360/236.4, 236.2, 236.9, 235.7, 236.5, 236, 236.8, 235.5

(56) References Cited

U.S. PATENT DOCUMENTS

| | | |
|---|---|---|
| 3,823,416 A | 7/1974 | Warner |
| 4,894,740 A | 1/1990 | Chhabra et al. |
| 5,418,667 A | 5/1995 | Best et al. |
| 5,420,735 A | 5/1995 | Haines |
| 5,508,077 A | 4/1996 | Chen et al. |
| 5,729,399 A | 3/1998 | Albrecht et al. |
| 5,870,250 A | 2/1999 | Bolasna et al. |
| 6,115,329 A | 9/2000 | Hu |
| 6,117,499 A | 9/2000 | Wong et al. |
| 6,137,656 A | 10/2000 | Levi et al. |
| 6,178,064 B1 | 1/2001 | Chang et al. |
| 6,333,835 B1 * | 12/2001 | Kang et al. ............... 360/235.4 |
| 6,351,345 B1 * | 2/2002 | Kameyama ............... 360/236.3 |
| 6,356,412 B1 * | 3/2002 | Levi et al. .................. 360/237 |
| 6,445,542 B1 * | 9/2002 | Levi et al. ................ 360/236.5 |
| 6,459,546 B1 * | 10/2002 | Mundt et al. ............ 360/236.3 |
| 6,462,909 B1 * | 10/2002 | Boutaghou et al. ...... 360/235.8 |
| 6,477,013 B1 * | 11/2002 | Kang et al. .............. 360/236.3 |
| 6,529,346 B2 * | 3/2003 | Otsuka ..................... 360/235.8 |
| 2002/0093765 A1 * | 7/2002 | Bolasna et al. .......... 360/236.2 |

FOREIGN PATENT DOCUMENTS

WO    WO 95/06942    3/1995

* cited by examiner

Primary Examiner—Brian E. Miller
(74) Attorney, Agent, or Firm—Liu & Liu

(57) ABSTRACT

A dual depth slider air bearing surface that enables the slider to achieve a ramp fly height profile near the textured landing zone of a disk. The air bearing slider includes a slider body on which a U-shaped leading ABS pad is defined near and along a leading edge (relative to a moving recording medium) and partially along each side of the slider body. A front step pad extends from the leading edge section of the leading ABS pad to the leading edge of the slider body, at a reduced height relative to the height of the ABS pad. An asymmetric rear pad is defined along a longitudinal axis of the slider body and proximate to a trailing edge of the slider body. Extending above the rear pad is a trailing ABS pad, which has an asymmetric profile with respect to the longitudinal axis of the slider. The trailing ABS pad has a curved bowing profile towards the front of the slider body on the leading edge side of the trailing ABS pad.

19 Claims, 8 Drawing Sheets

SLIDER AIR BEARING SURFACE HAVING IMPROVED FLY HEIGHT PROFILE CHARACTERISTICS

BACKGROUND OF THE INVENTION

1. Field of the Invention

This invention relates in general to magnetic recording disk drives, and more particularly to the configuration of the air bearing surface of a slider for use in a contact start/stop magnetic disk drive.

2. Description of Related Art

Disk drives are storage devices that use a rotatable disk with concentric data tracks containing information, a head or transducer for reading and/or writing data onto various tracks, and an actuator connected to a carrier for the head moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In typical magnetic recording disk drives, the head carrier is an air bearing slider that flies above the disk surface and maintains a very thin air cushion when the disk is rotating at its operational speed. The slider is maintained next to the disk surface by a relatively fragile suspension that connects the slider to the actuator. The suspension provides a small load (e.g., a gram load) on the slider by spring stiffness, pushing the slider toward to the disk, but the air flow in the air bearing under the slider creates a force that tends to push the slider away from the disk. The spacing between the slider and rotating disk can be maintained by the balance of the two forces.

For contact start/stop (CSS) disk drives, the air bearing slider is in contact with the disk surface during start and stop operations when there is insufficient disk rotational speed to maintain the air bearing. To reduce wear between the disk and slider, a thin lubricant layer is placed over the surface of the disk. When a drive is turned off, the slider is typically brought to the inner radius of the disk to land on the disk surface. A dedicated textured landing area (or landing zone) is designated, typically at the inner radius of the disk surface, for the purpose of providing a landing surface for the slider and to minimize stiction. The structure of the landing zone texture can be formed by a laser tool, producing evenly spaced crater or half sphere shaped bumps with height of 130–150 Å.

Stiction results when the air bearing surface (ABS) of the slider has been in stationary contact with the disk for a period of time and tends to resist translational movement or "sticks" to the disk surface. Stiction is caused by a variety of factors, including static friction and adhesion forces between the disk and slider created by the thin film of lubricant. Excessively high stiction force can cause hard disk drive non-operable because the spindle motor current may not be enough to overcome the adhesion force between the slider and disk. Stiction can also result in damage to the head or disk when the slider suddenly breaks free from the disk surface when disk rotation is initiated. In addition, because the suspension between the actuator and the slider is relatively fragile to permit the slider to fly above the disk surface, sudden rotation of the disk can also damage the suspension. In general, landing zone bump height is one of the most important factors affecting stiction level (the higher the bump height, the lesser the stiction). Stiction can be further reduced by optimizing the shape, size, and density of the bumps in the landing zone.

The main problem with the imparting higher bump height of laser texture to the landing zone area of the disk is that it brings the disk surface that much closer to a flying head. The margin between the flying height and the top most region of the texture area is reduced, thereby increasing the potential for head disk contact and hence the possibility of a head crash. IBM's U.S. Pat. No. 5,870,250 disclosed the use of different slider profiles having a single etch depth design to produce a fly height profile in which the slider typically flies higher over a textured landing zone than over a data zone of a disk. The slider profiles incorporate either a central rail or a side rail to achieve different fly height profiles. However, the fly heights achieved by the prior art ABS slider designs are not suitable for low fly height products due to its inability to fly low in addition to meeting other operating factors such as fly height sensitivity, altitude loss, and seek loss. As the pressure to increase recording density forces lower flying heights, the balance between maintaining bump height on the landing zone and the need to fly lower on the data zone is a difficult challenge. What is needed is an improved air bearing slider design that is capable of landing and clearing the texture landing zone while being able to maintain a flat fly height as close to the disk as possible.

SUMMARY OF THE INVENTION

The present invention overcomes the drawbacks of the prior art by configuring a dual depth slider air bearing surface having a novel rear pad and trailing ABS pad that enable the slider to achieve a ramp fly height profile near the textured landing zone of a disk. The air bearing slider structure includes a slider body on which a U-shaped leading ABS pad is defined near and along a leading edge (relative to a moving recording medium) and partially along each side of the slider body. A front pad extends from the leading edge section of the leading ABS pad to the leading edge of the slider body, at a reduced height relative to the height of the ABS pad. An asymmetric or skewed rear pad is defined along a centerline or longitudinal axis of the slider body and proximate to a trailing edge of the slider body. Extending above the rear pad is a trailing ABS pad. In accordance with one embodiment of the present invention, the trailing ABS pad has an asymmetric profile with respect to the longitudinal axis of the slider. The trailing ABS pad has a wider section (in the direction of the longitudinal axis) on one side of the longitudinal axis and a narrow section on another side of the longitudinal axis, with a curved bowing profile on the leading edge side of the trailing ABS pad.

DETAILED DESCRIPTION OF THE PREFERRED EMBODIMENT

This invention is described in a preferred embodiment in the following description with references to the following figures. While this invention is described in terms of the best mode of achieving this invention's objectives, it will be appreciated by those skilled in the art that variation may be accomplished in view of these teachings without deviating from the spirit or scope of the invention.

Figure 1:
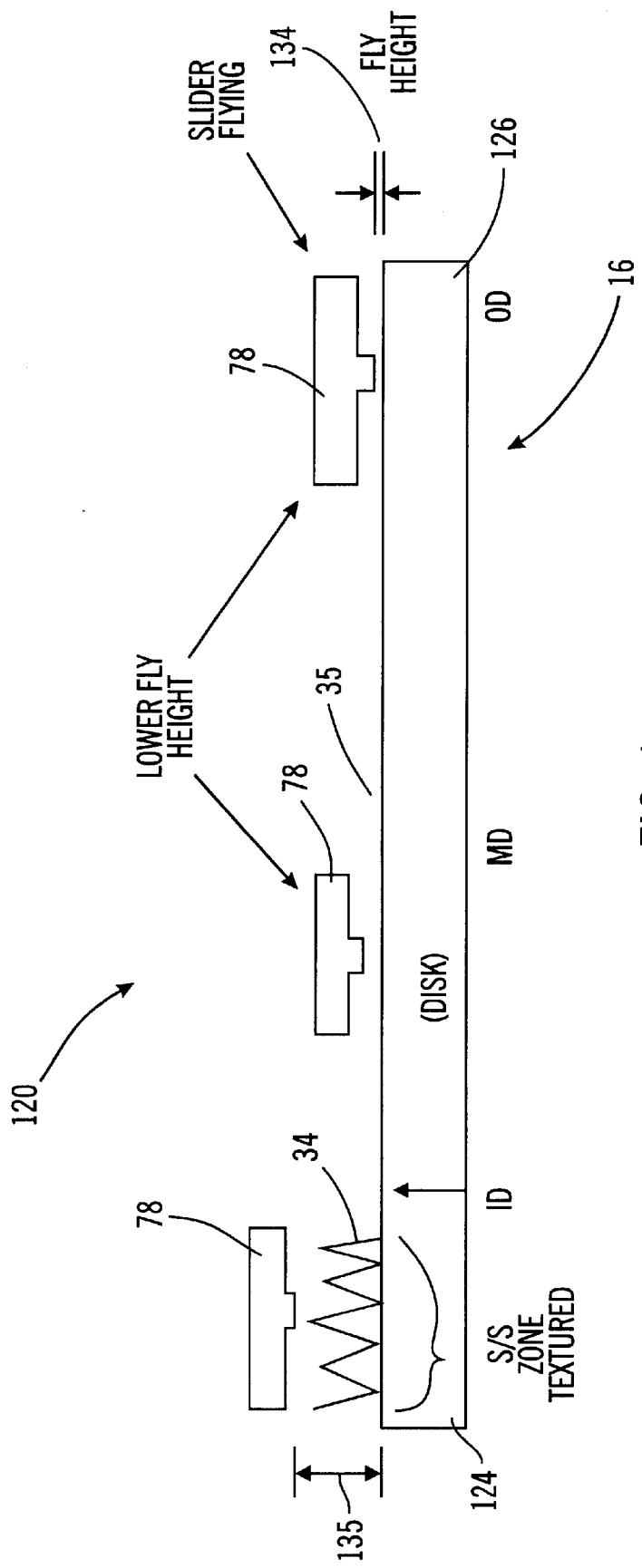
FIG. 1 illustrates a disk/slider combination in accordance with the present invention.
Figure 5:
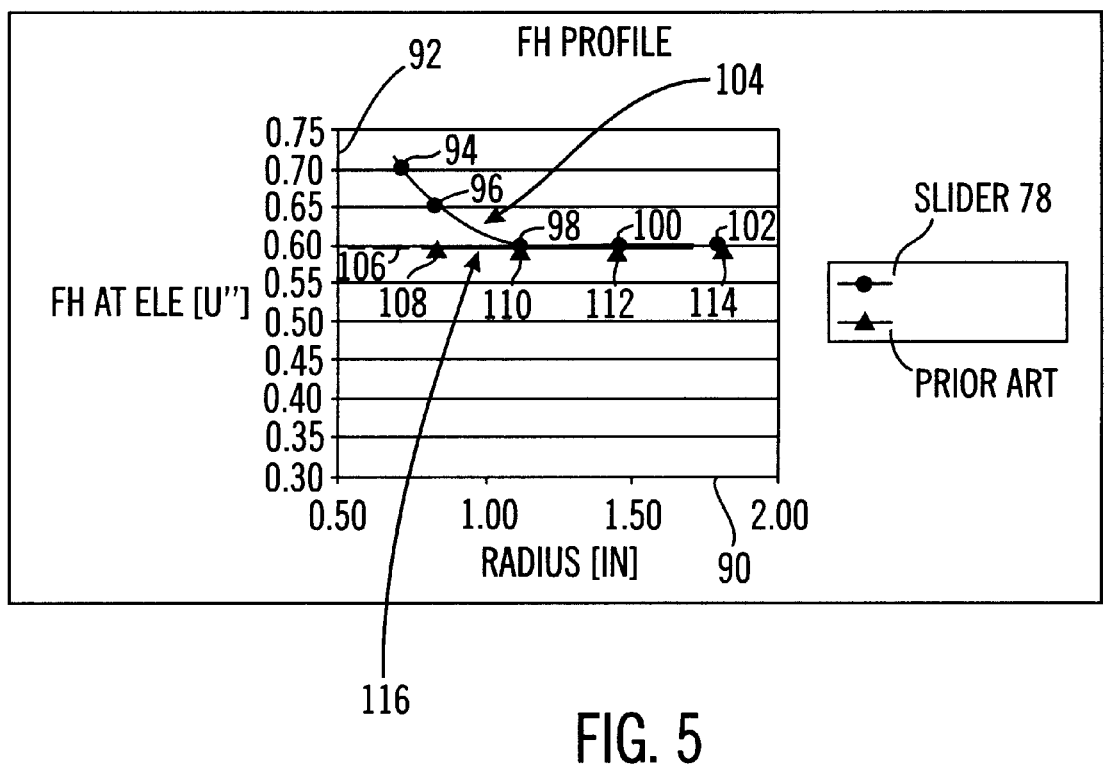
FIG. 5 is a graph illustrating the air bearing slider fly height as a function of radial distance from the center of a disk.

FIG. 1 illustrates a disk/slider combination 120 in accordance with the present invention. The disk 16 has an inner diameter 124 and an outer diameter 126. At the inner diameter 124 is a laser textured start-stop landing zone 34 to decrease stiction. The remaining portion of the disk 16 is a relatively smooth magnetic recording surface 35. Those skilled in the art will recognize that the entire surface of the disk 16 may include a textured surface. However, those skilled in the art will recognize that the texture is much more coarse over the landing zone 34. Accordingly, the texture surface is not drawn to scale in FIG. 1, but rather illustrates the fly height profile of the disk/slider combination 120. The air bearing slider 78 in accordance with the present invention exhibits a selected fly height 135 over the landing zone 34 as illustrated in FIG. 1. However, as the air bearing slider 78 is positioned away from the landing zone 34 to a position over the rotating magnetic recording surface 35, the air bearing slider 78 exhibits a lower fly height 134. Reference is made to FIG. 5, in which curve 104 illustrates the fly height profile from the landing zone and across the recording surface 35 of the disk.

Figure 2:
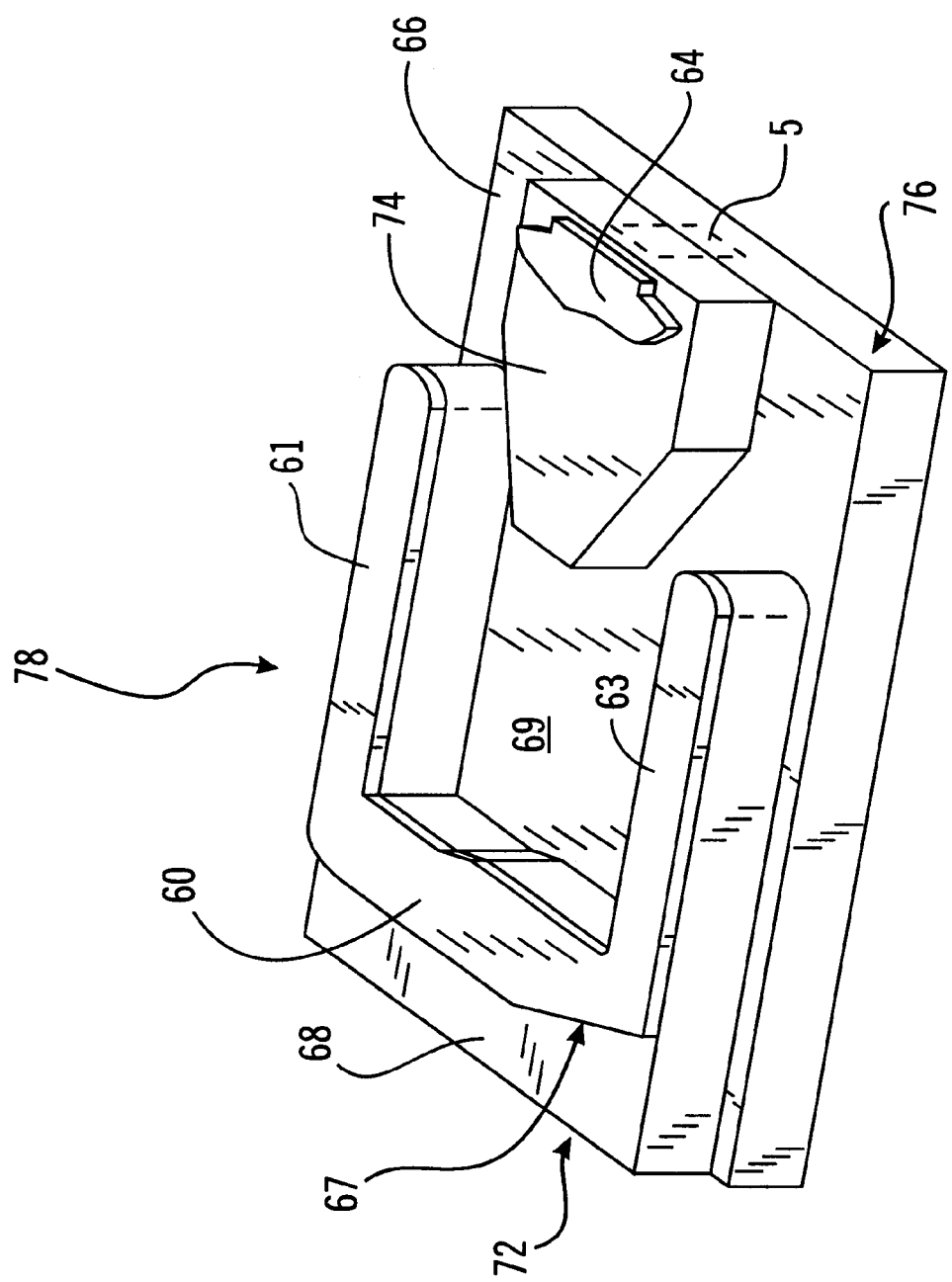
FIG. 2 is a perspective view of the air bearing slider in accordance with one embodiment of the present invention.

FIG. 2 shows in perspective the air bearing surface of the slider 78. Shown in FIG. 3 is the top view of the air bearing surface of the slider 78, and FIGS. 4A and 4B are sectional views of the slider 78 showing the dual depth structure of the air bearing surface.

Figure 3:
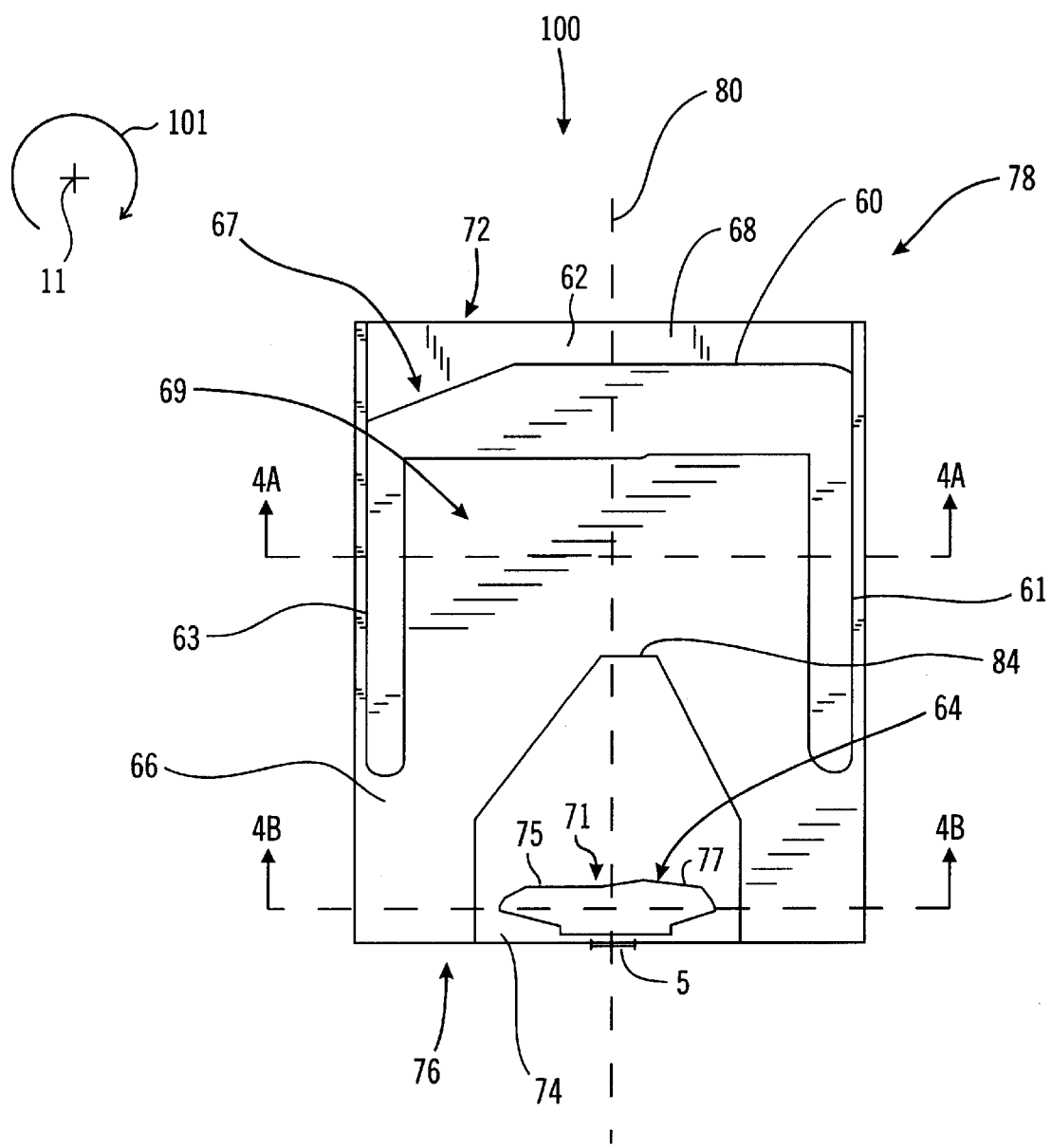
FIG. 3 is a top view of the air bearing surface of the slider of FIG. 2.
Figure 4A:
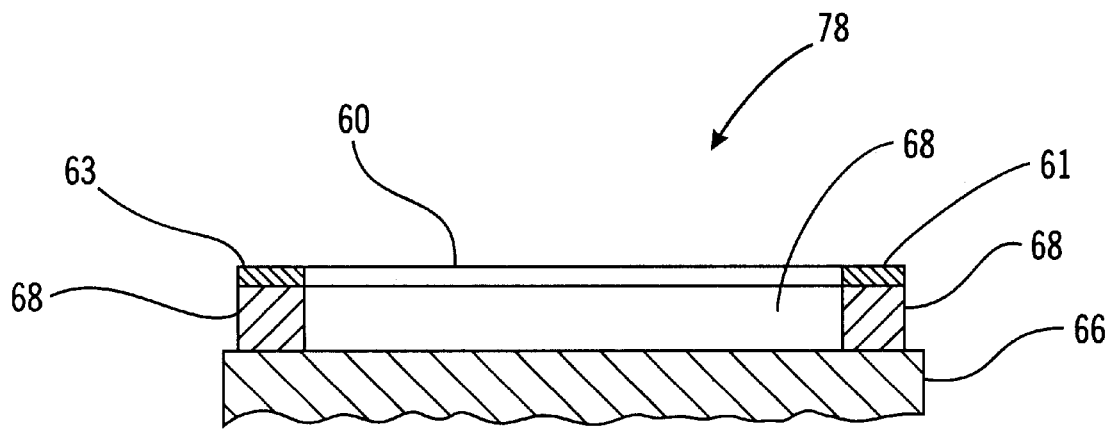
FIG. 4A is a sectional view of the air bearing slider taken along line 4A—4A in FIG. 3.
Figure 4B:
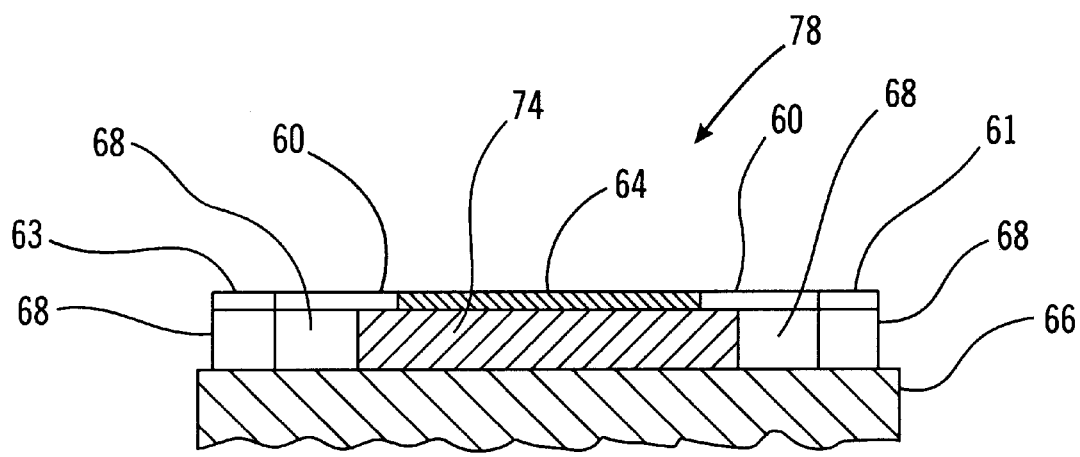
FIG. 4B is a sectional view of the air bearing slider taken along line 4B—4B in FIG. 3.

The slider 78 includes a body 66 having a leading edge 72 and a trailing edge 76 relative to the motion of the disk 16 (represented by arrow 100) in FIG. 3, and a longitudinal axis 80 along the length of the slider 78. The slider 78 further includes a U-shaped front pad 68 defined on the slider body 66, and along the leading edge 72 and partially along the right and left side of the slider 78. The height of the front pad 68 is on the order of 1.32 to 1.52 $\mu$m in the particular embodiment shown. A U-shaped leading end ABS pad 60 is defined on the front pad 68, extending from the rear half of the front pad 68 (section 62) and continues along side ABS pads 61 and 63 above the pad 68. The ABS pad 60 is on the order of 0.18 to 0.28 $\mu$m in height above the pad 68 for the embodiment shown. It can be seen that the ABS pad 60 and the pad 68 together create a "cavity" 69 having a generally U-shaped wall, at the front center of the air bearing surface.

The ABS pad 60 is skewed at a defined angle 67 at the corner where the side ABS pads 63 meets the front section 62 of the ABS pad 60. This angle 67 helps to improve the take-off velocity of the slider 78 at the landing zone 34 of the disk 16 and has minimal effect on the slider fly height towards the middle and outer diameter of the disk. The angle 67 is in the general direction of the landing zone. In FIG. 3, the center of the disk 16 is generally represented at 11 with the direction of rotation of the disk 16 represented by arrow 101. The angle 67 is determined by maximizing the take off velocity of the slider and meeting a targeted fly height profile across the disk surface. While not shown in the figures, the front section of pad 68 may slope down to body 66 and towards the leading edge 72 to improve lift of the leading edge 72 relative to the trailing edge 76 to achieve a positive pitch of the slider 78 during disk drive operations.

An asymmetric or skewed hexagonal shaped rear pad 74 is defined on the body and partially along the trailing edge 76, and centered near the longitudinal axis 80. The rear pad 74 generally tapers from a wide end at the trailing edge 76 to a narrow end towards the center of the slider 78. In the embodiment shown in FIG. 3, the sides of the rear pad 74 near the trailing edge 76 are parallel before skewing towards the center of the slider 78 at an angle of approximately 40 degrees. The size of the rear pad 74 is on the order of 520 $\mu$m wide by 580 $\mu$m in the longitudinal axis direction, and the height of the rear pad 74 is on the order of 1.32 to 1.52 $\mu$m. (The slider body 66 has a dimension on the order of 1.0 mm wide by 1.245 mm in the longitudinal axis direction.)

A trailing ABS pad 64 extends above the read pad 74, at a location proximate to the trailing edge 76 of the slider 78. The size of the trailing ABS pad 64 is on the order of 400 $\mu$m×90 $\mu$m and the height is between 0.18 and 0.28 $\mu$m. As illustrated in FIG. 3, the trailing ABS pad 64 has an asymmetric profile with respect 77 (in the direction of the longitudinal axis 80) on one side of the longitudinal axis and a narrower section 75 on another side of the longitudinal axis, with a curved bowing profile on the leading edge side of the trailing ABS pad, which includes a generally convex section and a generally concave section (more clearly shown in FIG. 9). As shown in FIG. 3, the narrower section 75 is on the side closer to the center 11 of the disk 16. A magnetic transducer 5 is attached to the trailing edge side 76 of the slider, centered along the longitudinal axis 80, generally as shown in FIG. 2.

In the illustrated embodiment, the leading edge of the section 75 of the trailing ABS pad 64 is substantially parallel with the trailing edge 76 of the slider 78, and the section 77 slightly bows outward towards the leading edge 72 of the slider 78, forming a "hump" or bowing profile 71 along the leading edge of the ABS pad 64. The center section of the trailing edge of the trailing ABS pad 64 is parallel to the trailing edge 76 of the slider 78 before slightly skewing towards the leading edge 72 of the slider 78. The left and right corners of the trailing ABS pad 64 are slightly rounded.

Figure 9:
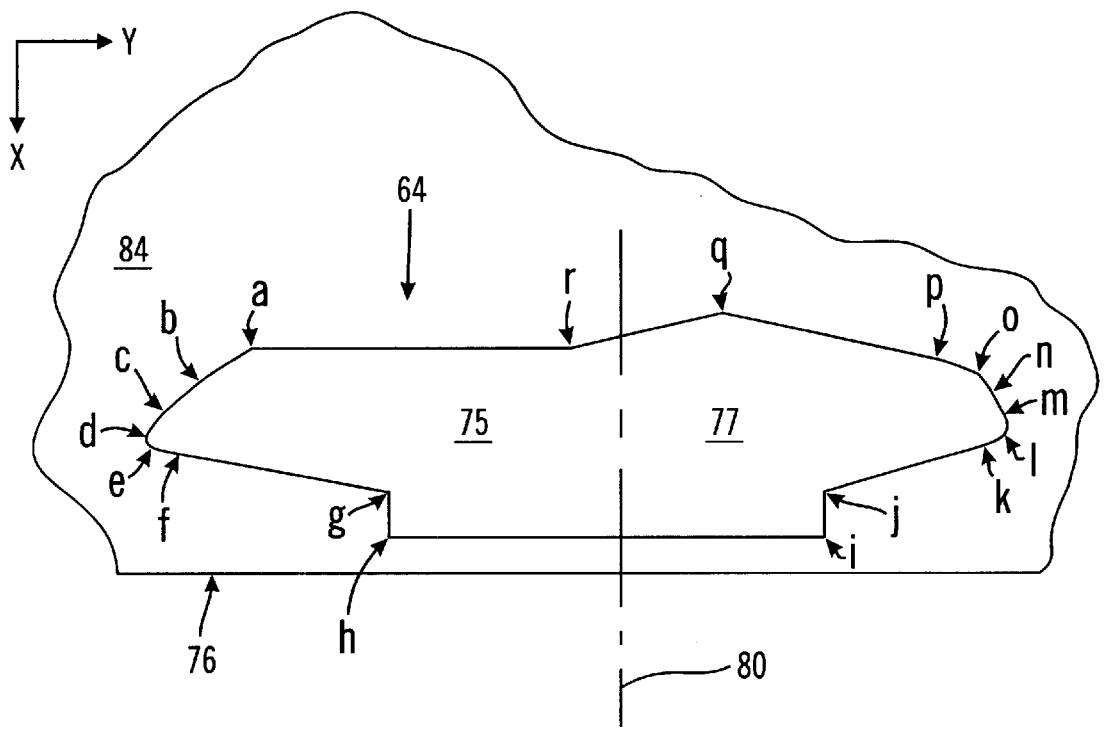
FIG. 9 is an enlarged top view of the trailing ABS pad in FIG. 3.

Referring to FIG. 9, the curved bowing profile of the trailing ABS pad 64 is more clearly shown. The normalized profile dimension is given in the table below in terms of normalized X and Y coordinates. The X values represents the locations of points along the perimeter of the trailing ABS pad 64 as measured from the leading edge 72 of the slider 78, and are normalized using the longitudinal length of the slider (for the example discussed above, the length of the slider is 1.245 mm). The Y values represents the locations of points along the perimeter of the trailing ABS pad 64 as measured from the left edge (viewed in FIG. 3) and are also normalized using the length of the slider. In this embodiment, the planar area of the section 77 is about 10% larger than that of the section 75, about the longitudinal axis 80. The wider section 77 is about 15% wider than the narrower section 75. As can be seen in FIG. 9, the curved bowing profile of the trailing ABS pad includes a generally concave section (along Point a, Point r and Point q) and a generally convex section (along Point r, Point q and Point p) having adjacent sections r–q, and p–q extending obliquely towards the trailing edge 76, on either side of the apex q.

| Point | X | Y |
|---|---|---|
| a | .91 | .25 |
| b | .92 | .24 |
| c | .93 | .22 |
| d | .94 | .21 |
| e | .95 | .21 |
| f | .95 | .23 |
| g | .97 | .31 |
| h | .98 | .31 |
| i | .98 | .49 |
| j | .97 | .49 |
| k | .95 | .56 |
| l | .95 | .57 |
| m | .94 | .57 |
| n | .93 | .56 |
| o | .92 | .55 |
| p | .91 | .53 |
| q | .90 | .45 |
| r | .91 | .38 |

Figure 10:
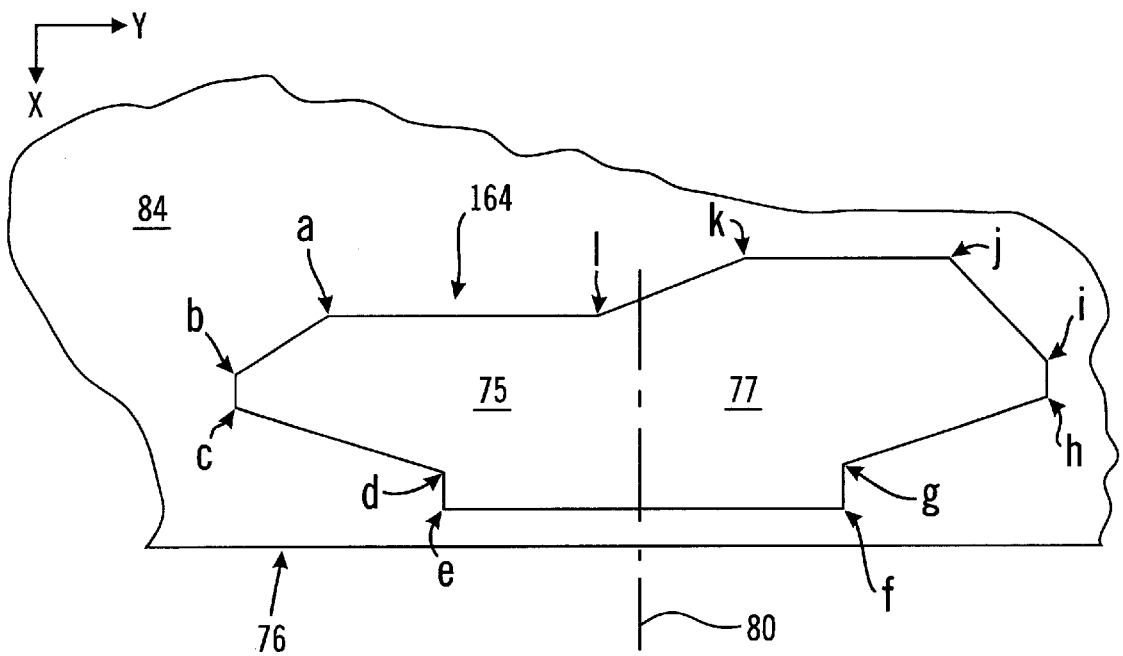
FIG. 10 is an enlarged top view of a trailing ABS pad in accordance with another embodiment of the present invention.

FIG. 10 shows another embodiment of a curved bowing profile of a trailing ABS pad 164. The X and Y normalized coordinates are showed in the table below. In this embodiment, the planar area of section 77 is about 20% larger than that of the section 75, about the longitudinal axis 80. The wider section 77 is about 30% wider than the narrower section 75. As can be seen in FIG. 10, the curved bowing profile of the trailing ABS pad includes a generally concave section (along Point a, Point l and Point k) and a generally convex section (along Point l, Point k, Point j and Point i) having adjacent section l–k and i–j extending obliquely towards the trailing edge 76, on either side of the apex j–k.

| Point | X | Y |
|---|---|---|
| a | .91 | .27 |
| b | .93 | .24 |
| c | .95 | .24 |
| d | .97 | .32 |
| e | .98 | .32 |
| f | .98 | .48 |
| g | .97 | .48 |
| h | .95 | .56 |
| i | .92 | .56 |
| j | .89 | .52 |
| k | .89 | .44 |
| l | .91 | .38 |

The size, location, and shape of the trailing ABS pad 64 are some of the parameters that affect the fly height profile and other functional requirements such as fly height sensitivity, altitude loss, and seek loss of the slider 78. The bowing profile along the right side (the wider section 77) of the leading edge of the trailing ABS pad 64 provides fine adjustment to the fly height of the slider 78. In accordance with the present invention, it is believed that the bowing profile provides an increase in fly height at the landing zone of the disk and has less effect at the recording surface 35 of the disk 16. The degree of bowing has a direct effect on the fly height of the slider, whereby a larger degree of bowing (for example, for the trailing ABS pad 164 shown in FIG. 10) increases the fly height given the same parameters. The wider section 77 is about 5 to 30% larger in planar area, preferably 5 to 20% larger and most preferably 10% larger, than the narrower section 75 for a given length (in the direction orthogonal to the longitudinal axis 80) of the sections about the longitudinal axis 80, and the wider section 77 is about 5 to 30% wider, preferably 10 to 20% wider and most preferably 15% wider, than that of the narrower section 75. Further, the location of the bowing profile along the leading edge of ABS pad 64 also affects the fly height. As the bowing profile 71 is positioned nearer to the middle of the leading edge (or the longitudinal axis 80) of the trailing ABS pad 64, this would increase the fly height of the slider over the recording surface 35 of the disk 16.

The slider 78, including the support body 66, the rear and front pads 74 and 68, and the leading and trailing ABS pads 60 and 64, is made of very hard material, typically Aluminum Titanium Carbide (Al$_2$TiC). While the illustrated embodiment shows the ABS pads 60 and 64 as separate layers from the underlying pad 74 and 68, it is within the scope and spirit of the present invention to construct the slider in an integral structure of the same material. The construction of the slider may be fabricated by processes known in the art. Typically a series of steps involving one or more of deposition (e.g., ion beam deposition, etc) and/or etching (e.g. ion milling (IM), reactive ion etching (RIE), etc.) are required for the fabrication. By way of illustration and not limitation, for the embodiment shown in the figures, the steps for the front and rear pads of 68 and 74 are produced by RIE process, and the steps for the leading and trailing ABS pads of 60 and 64 are produced by IM process.

Because the air velocity created by the rotating disk 16 varies in both magnitude and direction relative to the slider 78 at different radii across the recording surface 35, the slider 78 should preferably be designed to have an air bearing surface that can compensate for the varying air velocity to maintain a constant fly height across the recording surface 35. The configuration of the slider 78 in accordance with the present invention as described above has different pressure zones under the air bearing surface. The pressure zones are formed when the air bearing surface of the slider 78 is positioned adjacent to a magnetic recording surface 35 of magnetic disk 16 rotating to provide reaction forces to the applied gram load from the suspension 24 gram load. The air bearing pressure force and the applied load on the slider 78 are balanced in such a manner that the desired flying characteristics for the slider 78 can be achieved. In operation, air passing beneath the slider expands in the cavity 69 formed by the front rail 68, leading end ABS pad 60, and side ABS pads 61, 63 resulting in a negative pressure. This negative pressure over the cavity area provides a self-load force on the slider which forces the slider towards the disc surface and reduces the pitch of the slider 78. The amount of negative pressure is a function of the shape and size of the cavity 69. The leading end ABS pad 60, side ABS pads 61, 63 and trailing ABS pad 64 provide positive pressure or load that is greater than the negative pressure, which maintains the slider above the disc surface in balance with the gram load of the suspension 24. In accordance with the slider ABS configuration of the present invention, the pressure components are compensated in a manner such that the slider 78 flies at a desired pitch angle relative to the moving magnetic disk 16, and with a pitch attitude by which the trailing edge 76 of the slider 78, where a magnetic transducer is mounted, is closest to the disk surface 35 and assured to be spaced at a substantially constant fly height above the magnetic recording surface 35. Changes in the negative pressure from varying disk surface velocities are substantially offset by accompanying changes in the positive pressure in accordance with the present invention.

Figure 8:
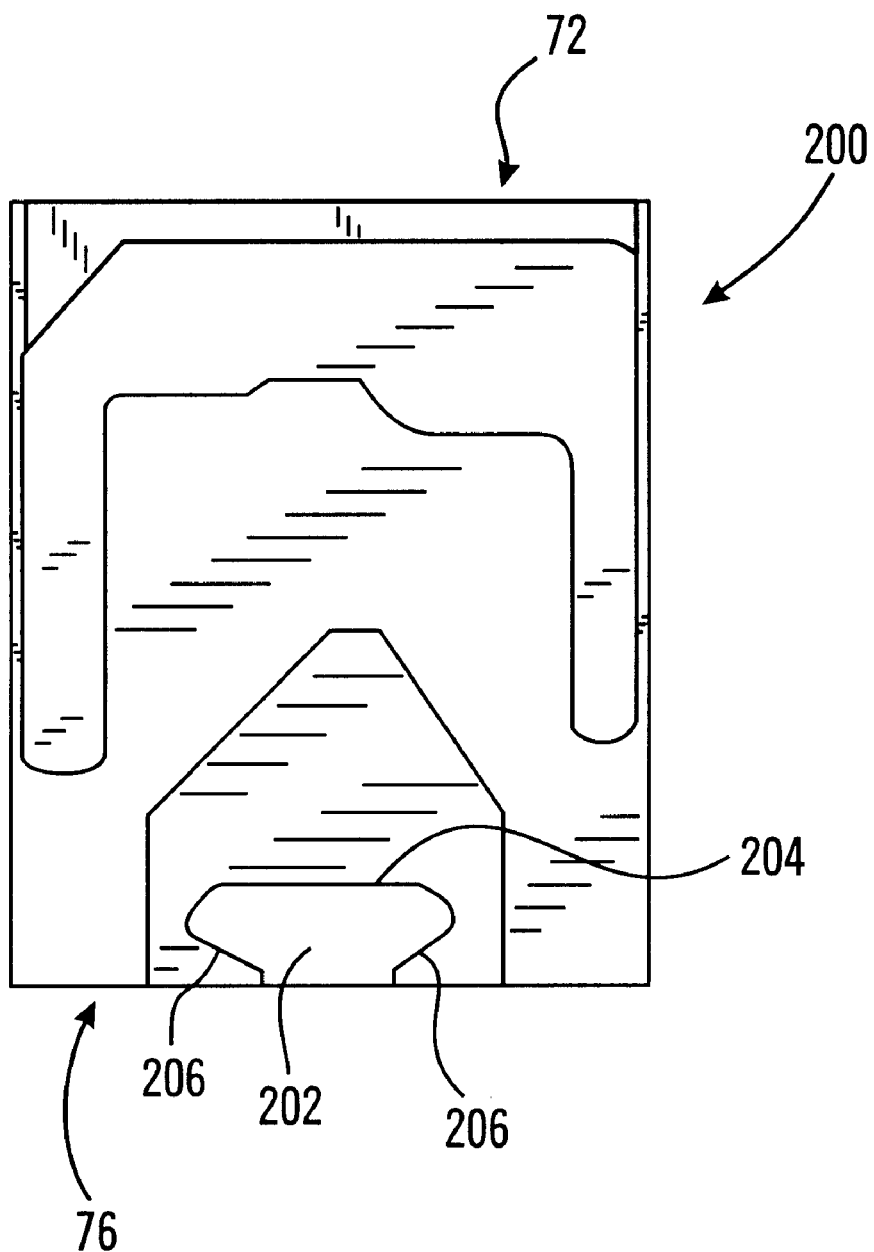
FIG. 8 is a top view of the air bearing surface of a prior art slider.

FIG. 5 is a graph illustrating the fly height profile 104 of the air bearing slider 78 illustrated in FIG. 1, as compared with IBM's prior art slider 200 shown in FIG. 8. The prior art slider 200 has a substantially symmetrical rear ABS pad, which has a flat leading edge 204 that is parallel with the trailing edge 76 of the slider 200, and a trailing edge 206 that slightly tapers inward.

Referring to FIG. 1, the fly height is the height measured from a magnetic transducer to the disk surface. The data used in this graph was obtained by using a proprietary modeling tool developed by IBM and the data was confirmed to be accurate through actual fly height measurements. The disk was operating at 7,200 RPM with a 2.5 gram load applied to the slider. The radial distance in inches, is shown along horizontal axis 90 and the fly height in micro-inches, is shown along the vertical axis 92. The nominal fly height of the magnetic transducer over the disk surface for the slider of the present invention is shown in curve 104 and curve 116 shows the average fly height for the prior art slider. Average fly height is used because actual fly height fluctuates slightly over time as the slider flies across the disk surface. Curve 104 representing the slider 78 of the present invention is constructed from five data points that represent different transitions of the magnetic transducer across the surface of the disk. The landing zone 34 is located in the area between data points 94 and 96, which is in a radial range on the order of between 0.612 and 0.836 inches. Curve 116 representing the prior art slider is constructed from four data points, and but extrapolated into the landing zone 34, since the fly height at the landing zone was not addressed by the prior art slider 200.

As can be seen from the graph, the curve of the slider of the present invention 104 exhibits a relatively high fly height over the landing zone 34 (data points 94 and 96) of the disk 16, and tapers to a lower fly height as the slider reaches the data recording zone 35 (data points 98, 100, and 102). Towards the outer diameter 102, the slider continues to exhibit a relatively constant fly height, although the velocity of the disk is rotating faster than the inner diameter. In contrast, the fly height of the prior art slider, shown in curve 116, exhibits a relatively constant fly height across the entire recording surface 35 of the disk (data points 106, 108, 110, 112, and 114). The fly height curve 104 for the slider 78 shows the ramp profile of the slider, with the slider flies higher over the landing zone 34 and lower over the data recording zone 35 of the disk 16.

Figure 6:
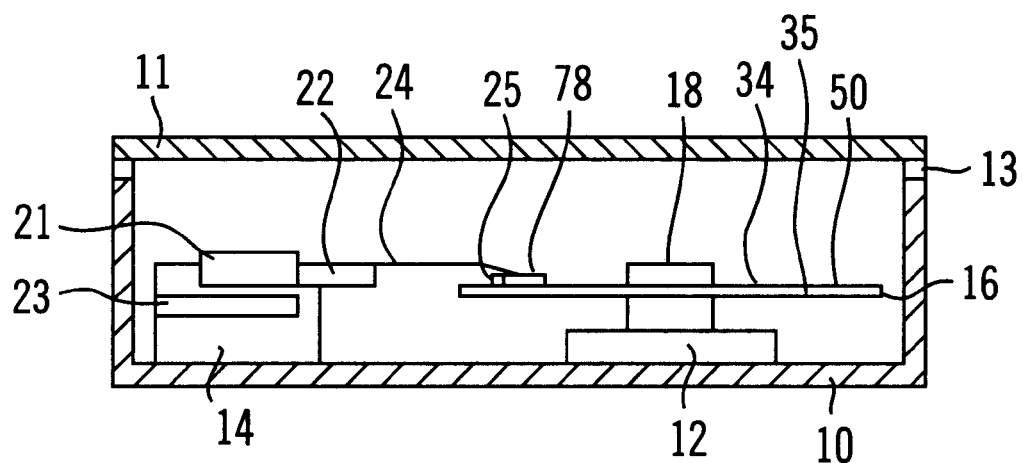
FIG. 6 is a schematic side view of a disk drive according to the present invention.
Figure 7:
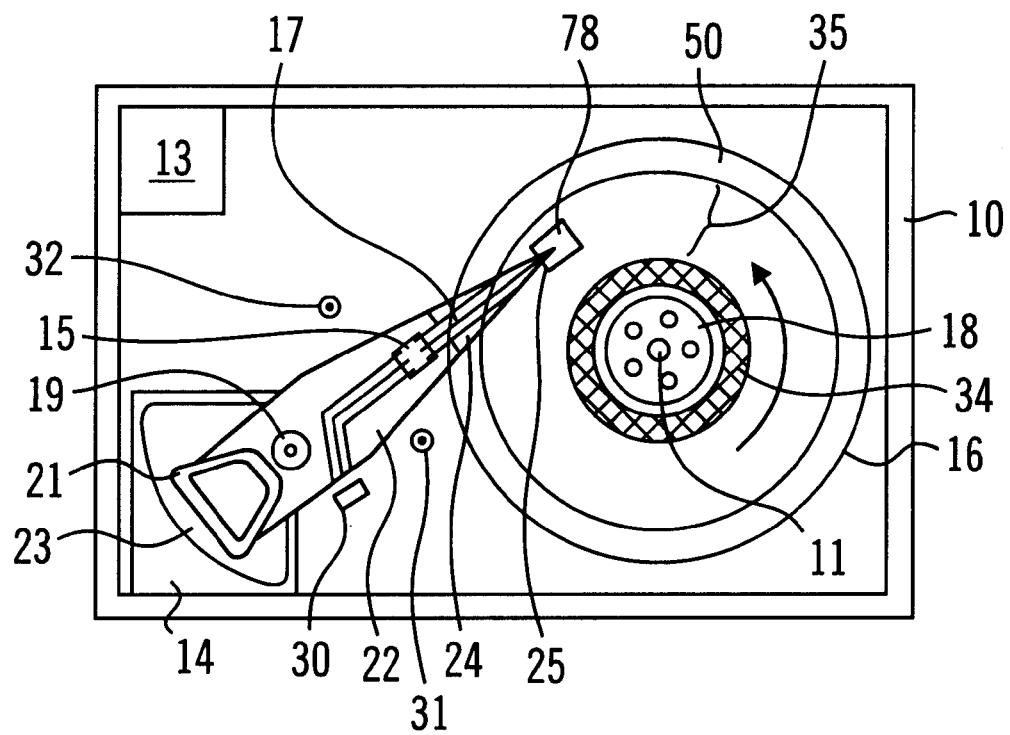
FIG. 7 is a top view of the disk drive of FIG. 6 with the cover removed and illustrating the textured landing zone.

Referring to FIGS. 6 and 7, there is illustrated a sectional schematic view and top view of a contact start/stop disk drive that uses the slider according to the present invention. The general operation of a disk drive having a laser textured landing zone is described in IBM's U.S. Pat. No. 5,729,399, entitled "Contact Start/Stop Disk Drive with Minimized Head-Disk Wear in Textured Landing Zone", which is fully incorporated herein by reference. The disk drive comprises a base 10 to which a spindle motor 12 and an actuator 14 are secured. The base 10 and cover 11 provide a substantially sealed housing for the disk drive. Typically, there is a gasket 13 located between base 10 and cover 11. A magnetic recording disk 16 is connected to spindle motor 12 by means of a spindle or hub 18. The disk 16 has a dedicated textured landing zone 34 near the disk inside diameter away from the disk data region 35. A thin film 50 of lubricant is maintained on the surface of disk 16. A read/write transducer or head 25 is formed on the trailing end of a head carrier, such as the air-bearing slider 78. Head 25 may be an inductive read and write transducer or an inductive write head with a magnetoresistive (MR) or Giant MR read head. The slider 78 is connected to the actuator 14 by means of a rigid arm 22 and a suspension 24, the suspension 24 providing a biasing force that urges the slider 78 onto the surface of the recording disk 16. The arm 22, suspension 24, and slider 78 with head 25 are referred to as the head-arm assembly 26. The actuator 14 is a balanced rotary voice coil motor (VCM) having a coil 21 that moves through the fixed magnetic field of magnet assembly 23 when current is applied to the coil 21. An inside diameter crash stop 31 and an outside diameter crash stop 32 are mounted to base 10 to limit the travel of rotary actuator 14. A latch 30 is also mounted to base 10 for engagement with the actuator or arm 22 to restrain movement of the actuator 14 when the disk drive is not operating. (It is noted that the features of the air bearing surface of the slider 78 in FIG. 7 is a mirror image of that shown in FIG. 3, because of the particular position of the actuator arm 22 in relation to the center of the disk 16. For example, the angle 67 and the side ABS pad 63 are on the side of the slider 78 (which has its air bearing surface facing the disk 16 in FIG. 7 instead of facing up) that is closer to the landing zone 34.

When the disk drive is stopped the actuator 14 will be at its parking location, i.e., with the actuator 22 latched by latch 30 and with the air-bearing surface of slider 78 in contact with the laser textured surface of the disk landing zone 34 near the disk ID. During operation of the disk drive, the spindle motor 12 rotates the disk 16 and the actuator 14 is unlatched and pivots on shaft 19 to move the slider 78 generally radial across the surface of the disk tracks on disk 16. The precise data track accessing and centerline positioning is accomplished by control electronics (schematically shown as module 13) that receives servo positioning information recorded on the disk and read by the head.

The data detected from the disk data region 35 by the head 25 is processed into a data readback signal by signal amplification and processing circuitry in the integrated circuit chip 15 located on arm 22. The signals from head 25 travel via flex cable 17 to chip 15 which sends its output signals via cable 19.

While the present invention has been described with respect to the preferred embodiments in accordance therewith, it will be apparent to those in the skilled art that various modifications and improvements may be made without departing from the scope and spirit of the invention. Accordingly, the disclosed invention is to be considered merely as illustrative and limited in scope only as specified in the appended claims.

I claim:

1. An air bearing slider for supporting a transducer over a rotating recording medium having a relatively smooth data zone and at least one textured zone, comprising:

a support structure having a leading edge and a trailing edge, and a longitudinal axis along the length of the support structure; and an air bearing surface configured on the support structure to face the recording medium, said air bearing surface including a generally U-shaped leading ABS pad defined on the support structure, defining an open cavity in the air bearing surface closer to the leading edge of the slider, and an asymmetric trailing ABS pad about the longitudinal axis, wherein said trailing ABS pad has a leading edge having a curved bowing profile that includes a generally concave section and a generally convex section having an apex and adjacent sections extending obliquely towards the trailing edge on either side of the apex.

2. An air bearing slider as in claim 1, wherein the support structure further comprises a front pad supported thereon, on which the leading ABS pad is supported, wherein the front pad has a section that extends beyond the leading ABS pad on the support structure, towards the leading edge of the support structure.

3. An air bearing slider as in claim 1, wherein the leading ABS pad includes a front pad and an ABS pad, wherein the front pad is of a reduced thickness, and extending beyond the ABS pad towards the leading edge of the support structure.

4. An air bearing slider as in claim 3, wherein the support structure further supports an asymmetric rear pad about the longitudinal axis, upon which the trailing ABS pad is supported.

5. An air bearing slider as in claim 1, wherein the curved bowing profile includes a bowed section that is located on a side with respect to the longitudinal axis which is farther from the textured zone of the recording medium when the air bearing slider is supporting the transducer over the recording medium and bows towards the leading edge of the slider.

6. An air bearing slider as in claim 1, wherein the trailing ABS pad has a narrower section on one side of the longitudinal axis which is closer to the textured zone of the recording medium when the air bearing slider is supporting the transducer over the recording medium and a wider section on another side of the longitudinal axis.

7. An air bearing slider as in claim 6, wherein the wider section is about 5 to 30% larger in planar area than the narrower section about the longitudinal axis.

8. An air bearing slider as in claim 7, wherein the wider section is about 5 to 20% larger in planar area than the narrower section about the longitudinal axis.

9. An air bearing slider as in claim 8, wherein the wider section is about 10% larger in planar area than the narrower section about the longitudinal axis.

10. An air bearing slider as in claim 6, wherein the wider section is about 5 to 30% wider than the narrower section.

11. An air bearing slider as in claim 10, wherein the wider section is about 10 to 20% wider than the narrower section.

12. An air bearing slider as in claim 11, wherein the wider section is about 15% wider, than that of the narrower section.

13. An air bearing slider as in claim 1, wherein the transducer is attached to the trailing edge of the slider.

14. A suspension assembly for supporting a slider in relation to a recording medium in a magnetic disk drive, comprising:

a suspension arm;

an air bearing slider supported at a distal end of the suspension arm, said slider comprising:

a support structure having a leading edge and a trailing edge, and a longitudinal axis along the length of the support structure; and an air bearing surface configured on the support structure to face the recording medium, said air bearing surface including a generally U-shaped leading ABS pad defined on the support structure, defining an open cavity in the air bearing surface closer to the leading edge of the slider, and an asymmetric trailing ABS pad about the longitudinal axis, wherein said trailing ABS pad has a leading edge having a curved bowing profile that includes a generally concave section and a generally convex section having an apex and adjacent sections extending obliquely towards the trailing edge on either side of the apex.

15. A magnetic disk drive, comprising:

a magnetic recording medium with a data surface of concentric data tracks having a relatively smooth data zone and at least one textured zone;

a motor drive for rotating the recording medium;

an air bearing slider comprising:

a support structure having a leading edge and a trailing edge, and a longitudinal axis along the length of the support structure;

an air bearing surface configured on the support structure to face the recording medium, said air bearing surface including a generally U-shaped leading ABS pad defined on the support structure, defining an open cavity in the air bearing surface closer to the leading edge of the slider, and an asymmetric trailing ABS pad about the longitudinal axis, wherein said trailing ABS pad has a leading edge having a curved bowing profile that includes a generally concave section and a generally convex section having an apex and adjacent sections extending obliquely towards the trailing edge on either side of the apex;

a transducer attached to the trailing edge of the slider;

an actuator assembly coupled to the slider for pivotally positioning said slider relative to the recording medium to selected tracks on the data surface; and an electronic module for controlling the operations of the motor drive and actuator assembly and processing data read from and written to the data surface.

16. An air bearing slider as in claim 1, wherein the curved bowing profile comprises a substantially parallel section with respect to the trailing edge of the support structure on one side of the longitudinal axis and a bowed section on another side of the longitudinal axis.

17. An air bearing slider as in claim 16, wherein the bowed section is convex with respect to the trailing ABS pad.

18. An air bearing slider as in claim 17, wherein the leading ABS pad defines a continuous structure without an opening towards the leading edge of the support structure.

19. An air bearing slider as in claim 3, wherein the ABS pad of the leading ABS pad defines a continuous structure without an opening towards the leading edge of the support structure.

* * * * *